US010358120B2

(12) United States Patent
Takase et al.

(10) Patent No.: US 10,358,120 B2
(45) Date of Patent: Jul. 23, 2019

(54) STOP MAINTAINING SYSTEM OF VEHICLE

(71) Applicant: Mazda Motor Corporation, Aki-gun, Hiroshima (JP)

(72) Inventors: Masaru Takase, Hiroshima (JP); Shigeyuki Uehara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 211 days.

(21) Appl. No.: 15/299,751

(22) Filed: Oct. 21, 2016

(65) Prior Publication Data

US 2017/0137008 A1 May 18, 2017

(30) Foreign Application Priority Data

Nov. 13, 2015 (JP) .................................. 2015-222614

(51) Int. Cl.
*B60T 8/88* (2006.01)
*B60T 7/04* (2006.01)
(Continued)

(52) U.S. Cl.
CPC ................ *B60T 8/88* (2013.01); *B60T 7/042* (2013.01); *B60T 7/122* (2013.01); *B60T 8/241* (2013.01);
(Continued)

(58) Field of Classification Search
CPC ... B60T 8/58; B60T 8/88; B60T 8/241; B60T 8/245; B60T 7/042; B60T 7/122;
(Continued)

(56) References Cited

U.S. PATENT DOCUMENTS 7,664,589 B2    2/2010   Etori et al.
2007/0007817 A1* 1/2007  Nonaga ................. B60T 13/746
                                                   303/155
(Continued)

FOREIGN PATENT DOCUMENTS

JP          08310383 A    11/1996
JP        2009190551 A     8/2000
(Continued)

*Primary Examiner* — Jacob S. Scott
*Assistant Examiner* — Lori Wu
(74) *Attorney, Agent, or Firm* — Alleman Hall Creasman & Tuttle LLP

(57) ABSTRACT

A vehicle stop maintaining system is provided, which includes a foot brake mechanism for braking vehicle wheels by applying hydraulic brake pressure according to brake pedal depression, a brake force control mechanism for braking the wheels by controlling a pressurizer, an electric parking brake mechanism for braking the wheels by operating an electric brake mechanism, and a controller comprising a processor for entering a first stop mode when a vehicle stopped state is detected. The processor executes a first determining module for determining existence of an interruptive factor, and a second determining module for determining a failure of the electric parking brake mechanism. If the interruptive factor exists, the controller executes a second stop mode. If the electric parking brake mechanism is determined as failed under the second stop mode, the controller operates a notification device for issuing a notification to a vehicle driver.

16 Claims, 5 Drawing Sheets

(51) Int. Cl.
*B60T 8/24* (2006.01)
*B60T 8/58* (2006.01)
*B60T 13/14* (2006.01)
*B60T 13/74* (2006.01)
*B60T 7/12* (2006.01)
*B60T 17/22* (2006.01)

(52) U.S. Cl.
CPC ............... *B60T 8/245* (2013.01); *B60T 8/58* (2013.01); *B60T 13/142* (2013.01); *B60T 13/741* (2013.01); *B60T 17/22* (2013.01)

(58) Field of Classification Search
CPC ...... B60T 13/142; B60T 13/741; B60T 17/22; B60W 10/18; B60W 10/182; B60W 10/184; B60W 10/188; B60W 10/192
See application file for complete search history.

(56) References Cited

U.S. PATENT DOCUMENTS

| | | | | |
|---|---|---|---|---|
| 2009/0206650 | A1* | 8/2009 | Ninoyu | B60T 13/588 303/3 |
| 2016/0297415 | A1* | 10/2016 | Kato | B60W 30/18118 |
| 2016/0339888 | A1* | 11/2016 | Yokoyama | B60T 7/042 |

FOREIGN PATENT DOCUMENTS

| | | |
|---|---|---|
| JP | 4674491 B2 | 4/2011 |
| JP | 4788354 B2 | 10/2011 |
| JP | 2011207405 A | 10/2011 |
| JP | 2014125044 A | 7/2014 |

\* cited by examiner

STOP MAINTAINING SYSTEM OF VEHICLE

BACKGROUND

The present invention relates to a stop maintaining system of a vehicle, particularly to a stop maintaining system of a vehicle, which maintains, when the vehicle is detected to be in a stopped state, the stopped state by operating a brake force control device.

As conventional brake devices of vehicles, foot brake devices which brake vehicle wheels by applying hydraulic brake pressure to hydraulic brake mechanisms according to depression of a brake pedal, brake force control devices which include a pressurizer for increasing the hydraulic brake pressure applied to hydraulic brake mechanisms, and brake vehicle wheels by controlling the pressurizer independently from depression of a brake pedal, and electric parking brake devices which brake vehicle wheels by operating an electric brake mechanism which is driven by an electric actuator independently from depression of a brake pedal, are known.

Further, when the vehicle is detected to be in a stopped state, a burden on a driver which accompanies the depression of the brake pedal can be reduced by operating the electric parking brake device. For example, JP4674491B discloses such an art.

Generally, the electric parking brake devices change a rotational motion of the electric actuator into a linear motion by the electric brake mechanism.

Since an operational response of such an electric parking brake device is low compared with brake force control devices represented by Anti-lock Brake Systems (ABSs) and Dynamic Stability Control (DSC) systems, when the accelerator pedal is depressed by the driver, the timing for a full release of the wheel brake force by the electric parking brake device is delayed, which may degrade a starting performance of the vehicle.

Therefore, a variety of arts are proposed for maintaining a stopped state of a vehicle by a brake force control device when the vehicle is detected to be in the stopped state.

JP4788354B discloses a travel control system for a vehicle capable of autonomous travel and including a brake force control device, an abnormal state detecting module for detecting a control abnormal state of the brake force control device, and a notification device to issue a notification. When the vehicle is detected to be in a stopped state, the travel control system operates a brake force control device capable of braking vehicle wheels by controlling a pressurizer independently from depression of a brake pedal, so as to maintain the stopped state. Further, when the vehicle is detected to be in the stopped state and also the abnormal state detecting module detects the abnormal state, the travel control system operates the notification device. Thus, the driver can acknowledge the control abnormality in the brake force control device, and as a result, the vehicle is prevented from starting unintendedly to the driver after the vehicle stops.

With the art of JP4788354B, a high vehicle starting performance can be achieved at the time of depression of the accelerator pedal by the driver from the vehicle stopped state, i.e., at the time of restart.

However, with the art of JP4788354B, when the control abnormality in the brake force control device is detected, the vehicle may start contrary to the driver's intention. Therefore, the driver needs to depress the brake pedal again to operate the foot brake device, so as to maintain the stopped state of the vehicle. However, the depression of the brake pedal will lower the function of reducing the burden on the driver.

For this reason, in order to maintain the stopped state of the vehicle, it may also be considered to separately operate the electric parking brake device when the control abnormality of the brake force control device is detected.

However, if the electric parking brake device is operated, since the notification continues to be issued due to the control abnormality in the brake force control device even though the electric parking brake device can maintain the stopped state of the vehicle, the driver may be bothered.

SUMMARY

The present invention is made in view of the above problems, and aims to provide a stop maintaining system of a vehicle, which is capable of achieving both high travel safety and high control operability while maintaining a function of reducing a burden which accompanies depression of a brake pedal.

According to one aspect of the present invention, a vehicle stop maintaining system including a foot brake mechanism for braking vehicle wheels by applying hydraulic brake pressure to hydraulic brake mechanisms according to depression of a brake pedal, a brake force control mechanism having a pressurizer that increases hydraulic brake pressure to be applied to the hydraulic brake mechanisms, and for braking the vehicle wheels by controlling the pressurizer independently from the depression of the brake pedal, an electric parking brake mechanism for braking the vehicle wheels by operating an electric brake mechanism that is driven by an electric actuator independently from the depression of the brake pedal, and a controller comprising a processor configured to enter a first stop mode in which the brake force control mechanism is operated to maintain the stopped state when the vehicle is detected to be in a stopped state, is provided. The processor is configured to execute a first determining module for determining existence of an interruptive factor that causes an interruption of traveling of the vehicle after stopping once, and a second determining module for determining a failure of the electric parking brake mechanism. The system further comprises a notification device for issuing a notification to a vehicle driver. If the first determining module determines that the interruptive factor exists, the controller enters a second stop mode in which the electric parking brake mechanism is operated to maintain the stopped state. If the second determining module determines the electric parking brake mechanism as failed under the second stop mode, the controller operates the notification device.

With the above vehicle stop maintaining system, when the first determining module determines that the interruptive factor exists, the controller enters a second stop mode in which the electric parking brake mechanism is operated to maintain the stopped state. Therefore, even if the interruptive factor which causes the interruption of the proper traveling after the vehicle stops once exists, the stopped state of the vehicle can be continued and maintained without burdening the driver due to the depression of the brake pedal.

Further, when the second determining module determines the electric parking brake mechanism as failed under the second stop mode, the controller operates the notification device. Therefore, the driver can be reliably notified of the situation where the stopped state of the vehicle cannot be continued and maintained.

Moreover, if the electric parking brake mechanism is able to maintain the stopped state of the vehicle, even if the brake force control mechanism cannot maintain it, the notification is not issued. Therefore, the issuance of notification can be suppressed to only minimal cases and the driver is not bothered.

The interruptive factor may include at least one of a failure of the brake force control mechanism, the brake force control mechanism being operated over a given period of time, an absence of the driver from a driver's seat, and an engine misfire.

According to the configuration, whether the vehicle is able to travel properly after the vehicle stops once can be determined based on, in addition to the failure of the brake force control mechanism, the operational intention of the driver and the engine state.

When the driver depresses an accelerator pedal in the first stop mode, the controller may cancel the first stop mode.

According to the configuration, the operational intention of the driver can be reflected and high vehicle starting performance can be obtained.

When the driver depresses the brake pedal within a given period in the second stop mode, the controller may stop the operation of the notification device.

According to the configuration, a notification period can be shortened while securing the travel safety, and the driver can avoid being bothered.

When the brake pedal is not depressed within a given period in the second stop mode, the controller may stop the operation of the notification device and cancel the first stop mode.

According to the configuration, the vehicle becomes allowed to move and the driver can be induced to operate the foot brake mechanism before leaving the seat.

DETAILED DESCRIPTION OF EMBODIMENT

Hereinafter, an embodiment of the present invention is described in detail with reference to the appended drawings.

The following description is an illustration of the present invention applied to a stop maintaining system of a vehicle, and is not intended to limit the scope of the present invention, applied field thereof, or application thereof.

Hereinafter, the embodiment of the present invention is described with reference to FIGS. 1 to 5.

Figure 1:
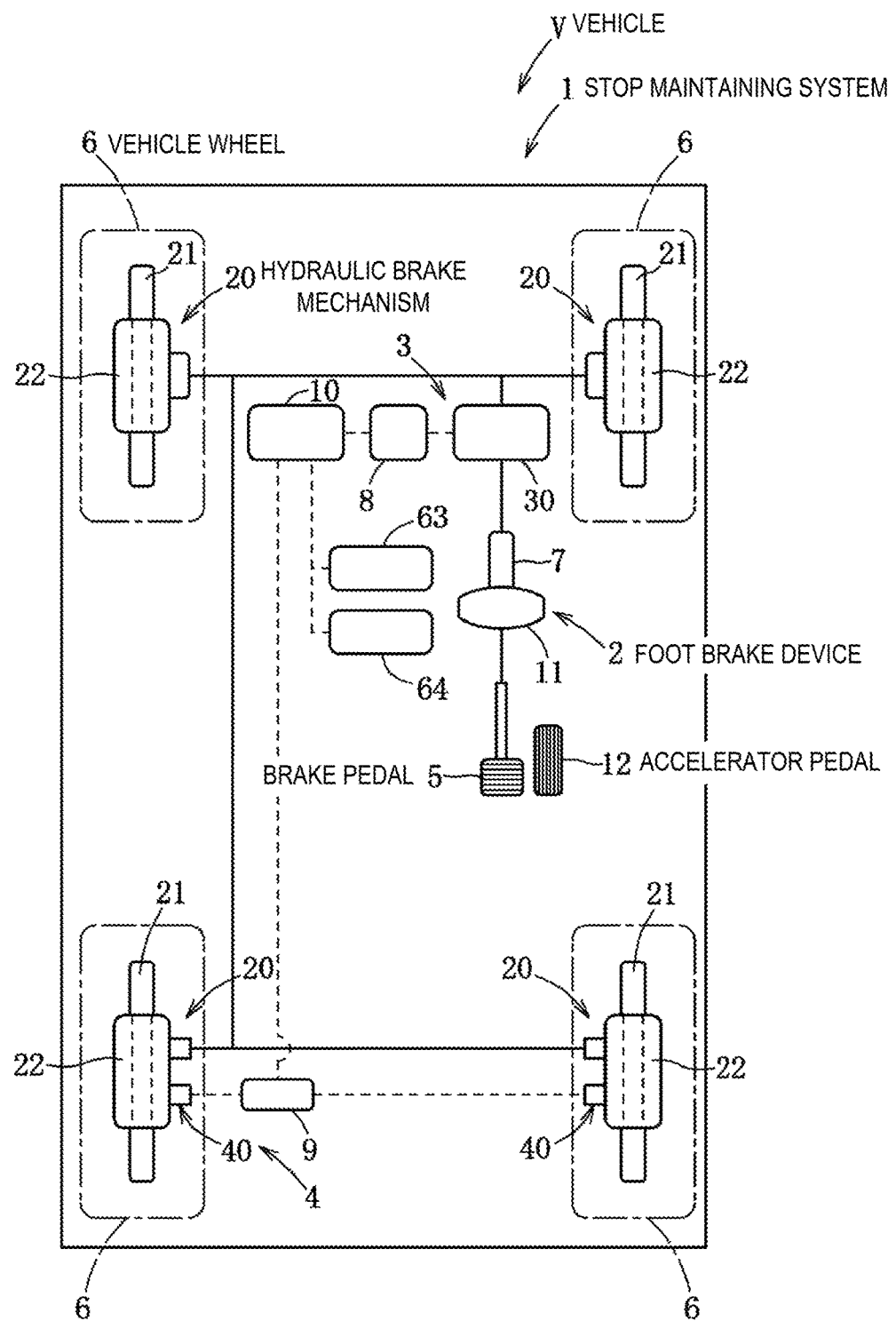
FIG. 1 is a schematic view of a vehicle on which a stop maintaining system of the vehicle according to one embodiment is mounted.
Figure 2:
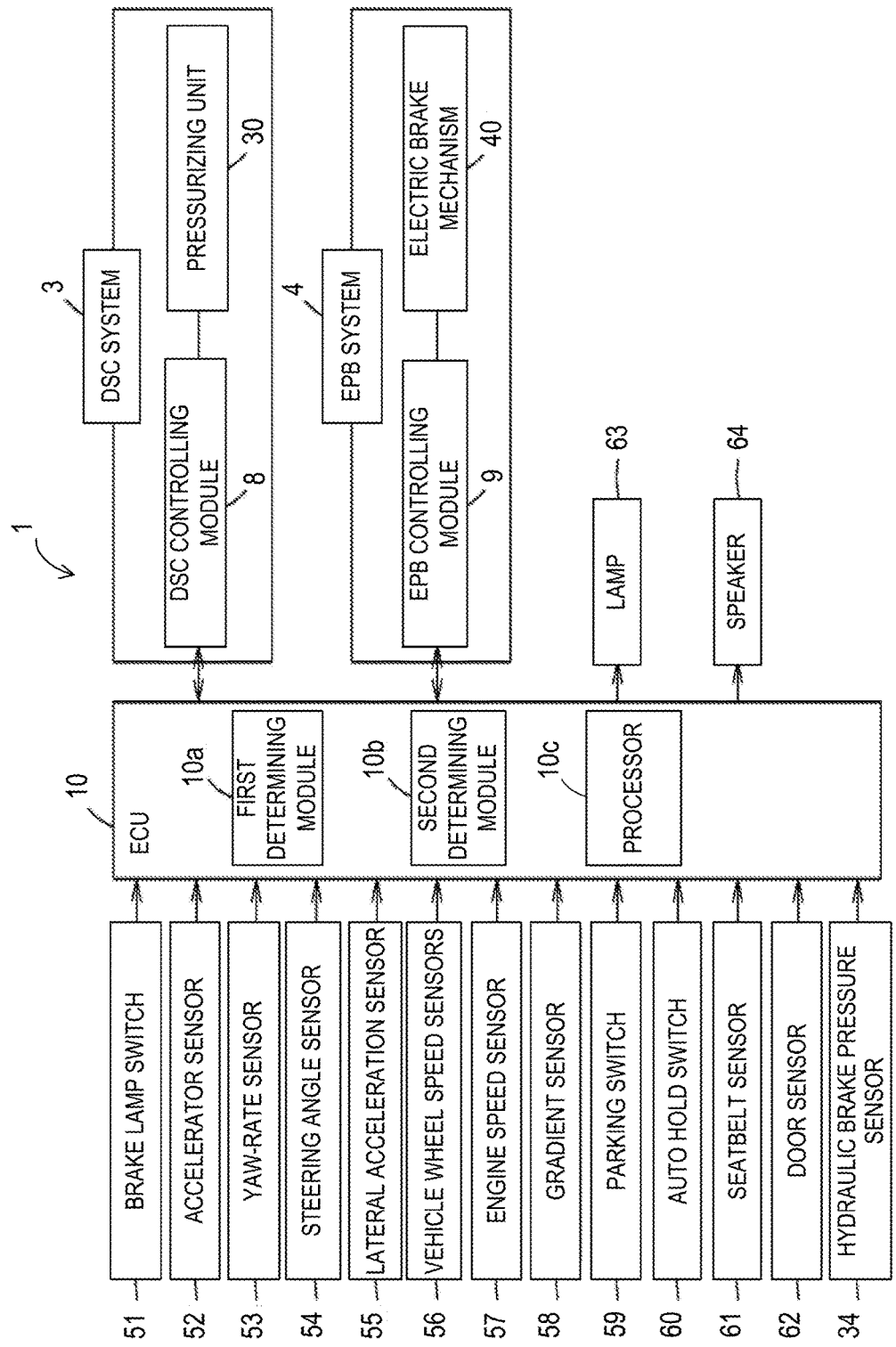
FIG. 2 is a block diagram of the stop maintaining system.

As illustrated in FIGS. 1 and 2, a vehicle V is mounted with a stop maintaining system 1.

The stop maintaining system 1 includes a foot brake device 2 (foot brake mechanism), a DSC (Dynamic Stability Control) system 3 (brake force control mechanism), an EPB (Electric Parking Brake) system 4 (electric parking brake mechanism), and an ECU (Electronic Control Unit) 10 (Controller).

First, the foot brake device 2 is described.

The foot brake device 2 brakes two front and rear pairs of vehicle wheels 6 by supplying to two front and rear pairs of hydraulic brake mechanisms 20, brake fluid pressurized according to depression of a brake pedal 5 (hereinafter, referred to as hydraulic brake pressure).

Figure 3:
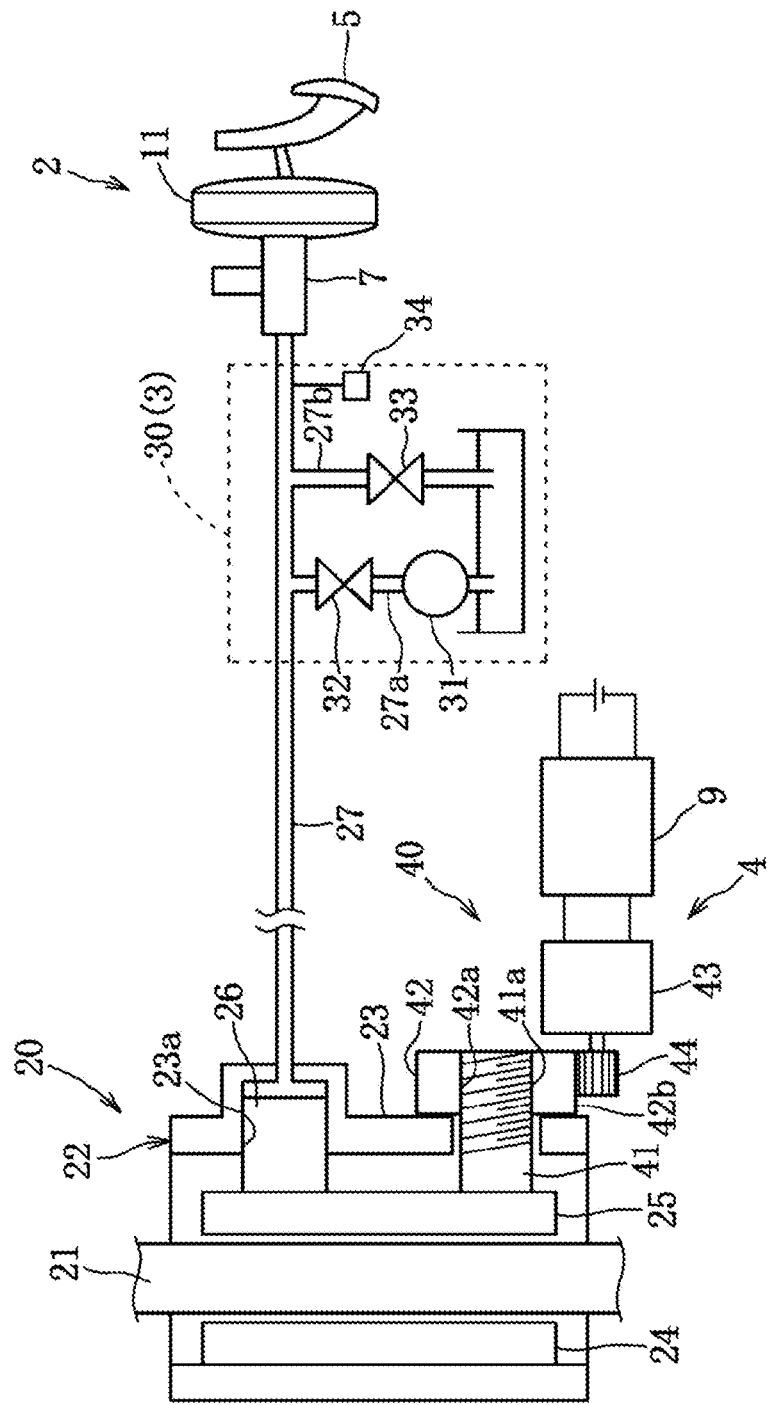
FIG. 3 is a schematic view illustrating part of a foot brake device, a DSC system, and an EPB (Electric Parking Brake) system.

As illustrated in FIGS. 1 and 3, the foot brake device 2 includes the brake pedal 5, a master cylinder 7, a booster 11, and the hydraulic brake mechanisms 20.

The booster 11 has a wall (not illustrated) movable in its axial directions in conjunction with the brake pedal 5, and boosts up the depression force of the brake pedal 5 by using a difference in pressure between a negative pressure chamber and an atmospheric pressure chamber which are divided from each other by the movable wall. The hydraulic brake mechanisms 20 provided to the respective vehicle wheels 6 are connected with the master cylinder 7 by a pipe 27, so as to apply a brake force to the respective vehicle wheels 6 according to the depression of the brake pedal 5 performed by a driver.

As illustrated in FIG. 3, each hydraulic brake mechanism 20 includes a rotor disk 21 provided with the vehicle wheel 6 to be integrally rotatable, and a caliper 22 for applying the brake force to the rotor disk 21.

The caliper 22 has a caliper body 23 mounted over the rotor disk 21, and an outer brake pad 24 and an inner brake pad 25 which are provided inside the caliper body 23 and interpose the rotor disk 21 therebetween.

A piston 26 is disposed on the inner side of the inner brake pad 25 to be movable in axial directions of the rotor disk 21, and the piston 26 is slidably fitted into a cylinder hole 23$a$ which is formed in the caliper body 23. The cylinder hole 23$a$ is connected to the pipe 27.

When the driver depresses the brake pedal 5, the hydraulic brake pressure is applied to the cylinder hole 23$a$ through the pipe 27, and moves outwardly the piston 26 in the axial directions.

Accordingly the inner brake pad 25 is pushed against the inner side of the rotor disk 21, and due to a counterforce against this, the caliper body 23 moves inward and the outer brake pad 24 is pushed against the outer side of the rotor disk 21. Thus, the brake force of the foot brake device 2 is produced.

Next, the DSC system 3 is described.

The DSC system 3 brakes the vehicle wheels 6 independently from the depression of the brake pedal 5. The DSC system 3, upon a satisfaction of an auto hold execution condition (an auto hold switch 60 is turned on and the vehicle V is in the stopped state), enters a first stop mode in which the stopped state of the vehicle V is maintained until an auto hold release condition (the depression of the brake pedal 5 is released and an accelerator pedal 12 is depressed) is satisfied. Note that the stopped state of the vehicle V is determined by the ECU 10, using a determination condition, such as the depression of the brake pedal 5 continues for over a given period of time.

As illustrated in FIGS. 1 to 3, the DSC system 3 includes a DSC controlling module 8 and a pressurizing unit 30 (pressurizer).

The DSC controlling module 8 may be a pre-programmed processor configured to control the functions of the DSC system 3. The DSC controlling module 8 receives an input signal from the ECU 10 and executes a DSC control to improve a travel safety in turning the vehicle V. Specifically the DSC controlling module 8, upon a determination that a turning attitude of the vehicle V deviated by a given value or above based on detection signals from a yaw-rate sensor 53, a lateral acceleration sensor 55, and vehicle wheel speed sensors 56, controls the brake force on the vehicle wheels 6 by operating the pressurizing unit 30, to orient the turning attitude of the vehicle V to a target direction by causing a yaw moment to act on a vehicle body.

Further the DSC controlling module 8 receives an input signal from the ECU 10 and executes an ABS control to prevent the respective vehicle wheels 6 from being locked. Specifically the DSC controlling module 8, upon a calculation of a slip ratio of each vehicle wheel 6 based on a detection signal of the vehicle wheel speed sensor 56 and a detection of a vehicle wheel 6 for which the calculated slip ratio exceeds a given threshold, prevents the locking of this vehicle wheel 6 by controlling the operation of the pressurizing unit 30 to reduce the brake force which acts on the vehicle wheel 6.

The DSC system 3 has, in addition to the attitude control functions like the DSC control and the ABS control, a brake device function executable of the first stop mode in which the stopped state of the vehicle V is maintained.

The DSC controlling module 8 measures a duration of the first stop mode, and outputs the measured time to the ECU 10.

As illustrated in FIG. 3, the pressurizing unit 30 includes a hydraulic pump 31, a pressurizing valve 32, a return valve 33, and a hydraulic brake pressure sensor 34 for detecting hydraulic brake pressure within the pipe 27.

The hydraulic pump 31 is disposed in a first branch path 27a branching from the pipe 27 and is constructed by an electric pump having an electric motor as its drive source. The hydraulic pump 31 receives electric power from an alternator while an engine (not illustrated) is in operation, and receives electric power from a vehicle-mounted battery (not illustrated) while the engine is stopped. The hydraulic pump 31 is controlled by the DSC controlling module 8.

The pressurizing valve 32 is disposed in the first branch path 27a between the hydraulic pump 31 and the pipe 27, and the return valve 33 is disposed in a second branch path 27b branching from the pipe 27. The valves 32 and 33 are constructed by electromagnetic valves and controlled by the DSC controlling module 8.

Next, the EPB system 4 is described.

The EPB system 4 is driven independently from the depression of the brake pedal 5 and enters a second stop mode in which the stopped state of the vehicle V is maintained when a given condition is satisfied.

As illustrated in FIGS. 1 to 3, the EPB system 4 includes an EPB controlling module 9 and an electric brake mechanism 40.

The EPB controlling module 9 may be a pre-programmed processor configured to control the functions of the EPB system 4. The EPB controlling module 9 receives an input signal from the ECU 10 and controls the vehicle wheel brake force of the electric brake mechanism 40. Specifically the EPB controlling module 9 controls the vehicle wheel brake force of the electric brake mechanism 40 to a given load, based on an ON signal of a parking switch 59 and an entrance signal of the second stop mode which are received from the ECU 10.

The EPB controlling module 9 measures a current value of an electric motor 43 and outputs the measured current value to the ECU 10.

As illustrated in FIG. 3, the electric brake mechanism 40 includes a piston 41, an annular member 42, and the electric motor 43.

A male thread 41a is formed on an inner end portion of the piston 41 and engaged with a female thread 42a formed on a circumferentially inner surface of the annular member 42. A gear surface portion 42b is formed on a circumferentially outer surface of the annular member 42 and engaged with a pinion 44 attached to a drive shaft of the electric motor 43 to be integrally rotatable. Therefore, by driving the electric motor 43, the annular member 42 is rotationally driven and the piston 41 is moved to progress/retreat in its axial directions.

Next, the ECU 10 is described.

If an engine stop condition (the depression of the brake pedal 5 continues over a given period of time) is determined as satisfied, the ECU 10 automatically stops (idle stops) the engine. After the automatic stop of the engine, if an engine restart condition (the depression of the brake pedal 5 is released and the accelerator pedal 12 is depressed) is determined as satisfied, the ECU 10 restarts the engine. Further, when the vehicle V is detected to be in the stopped state, which includes the automatic stop of the engine, the ECU 10 operates the brake device (here, the DSC system 3) to enter the first stop mode in which the stopped state of the vehicle V is maintained. When an interruptive factor which causes an interruption of proper traveling after the vehicle stops once is determined to exist under the first stop mode, the ECU 10 performs first fail processing which is entering the second stop mode in which the stopped state of the vehicle V is maintained by operating the EPB system 4.

Further when the EPB system 4 is determined as failed under the second stop mode, the ECU 10 performs second fail processing which is an operation of at least one of a lamp 63 and a speaker 64.

As illustrated in FIG. 2, the ECU 10 is electrically connected to a brake lamp switch 51, an accelerator sensor 52, the yaw-rate sensor 53, a steering angle sensor 54, the lateral acceleration sensor 55, the vehicle wheel speed sensors 56, an engine speed sensor 57, a gradient sensor 58, the parking switch 59, the auto hold switch 60, a seatbelt sensor 61, a door sensor 62 on the driver's seat side, the lamp 63 installed on a meter panel (not illustrated), the speaker 64 installed in a cabin, the hydraulic brake pressure sensor 34, etc.

Further, the ECU 10 receives input signals from the respective sensors, executes an operation control of the engine by a processor 10c, and outputs command signals to the DSC controlling module 8, the EPB controlling module 9, the lamp 63, the speaker 64, etc. as needed.

The brake lamp switch 51 outputs a detection signal upon detecting the depression of the brake pedal 5 performed by the driver, and the accelerator sensor 52 outputs a detection signal upon detecting a depressed amount of the accelerator pedal 11. The yaw-rate sensor 53 outputs a signal corresponding to the yaw rate of the vehicle V, and the steering angle sensor 54 outputs a signal relating to a steering angle of a steering wheel (not illustrated) controlled by the driver. The lateral acceleration sensor 55 outputs a signal relating to an acceleration of the vehicle V in vehicle width directions, and the vehicle wheel speed sensors 56 output signals based on rotational speeds of the vehicle wheels 6, respectively.

The engine speed sensor 57 outputs a signal based on an engine speed, the gradient sensor 58 outputs a signal based on an inclination of a road surface where the vehicle V is stopped, and the hydraulic brake pressure sensor 34 outputs a signal based on hydraulic brake pressure within the pipe 27.

The seatbelt sensor 61 outputs a detection signal upon detecting the unbuckled seatbelt by the driver, and the door sensor 62 outputs a detection signal upon detecting the opened door by the driver.

The parking switch 59 operates the EPB system 4 to stop the vehicle V. The parking switch 59 is turned on/off by the driver. In the ON state, the parking switch 59 constantly outputs an ON signal to the ECU 10, and in the OFF state, the parking switch 59 constantly outputs an OFF signal to the ECU 10. The auto hold switch 60 automatically maintains the stopped state of the vehicle V even when the driver removes his/her foot from the brake pedal 5 while waiting at a traffic light or in heavy traffic jam. This auto hold switch 60 is turned on/off by the driver. In the on state, the auto hold switch 60 constantly outputs an ON signal to the ECU 10, and in the off state, the auto hold switch 60 constantly outputs an OFF signal to the ECU 10.

When the EPB system 4 is determined as failed under the second stop mode, the lamp 63 turns on and the speaker 64 issues an alarm sound based on the command signals from the ECU 10.

As illustrated in FIG. 2, the ECU 10 includes a first determining module 10a and a second determining module 10b. The modules 10a and 10b may be software modules stored in non-volatile memory (not illustrated) and executable by the processor 10c to enact their respective functions.

The first determining module 10a determines existence of the interruptive factor which causes the interruption of the proper traveling after the vehicle stops once. Note that in this embodiment, the interruptive factor is defined to include a factor regarding the failure of the DSC system 3, a factor regarding other than the DSC system 3, a factor regarding an operational intention of the driver, and a factor which leads to a failure of the DSC system 3.

When the hydraulic brake pressure within the pipe 27 based on the output of the hydraulic brake pressure sensor 34 is a determination threshold or below, the first determining module 10a determines the DSC system 3 as failed. When an engine misfire (engine stall) is detected by the ECU 10 based on signals from the engine, the first determining module 10a determines an abnormality other than the failure of the DSC system 3 as occurred. Further when an absence of the driver from the seat (non-drivable state) is detected based on the output of one of the seatbelt sensor 61 and the door sensor 62, the first determining module 10a determines that the operational intention of the driver is lacking. When the first stop mode duration based on the measurement value of the DSC controlling module 8 is detected to be a given period of time (e.g., 10 minutes) or longer, the first determining module 10a determines that DSC system 3 has a possibility of failure. This is because, since the DSC system 3 has many slidable components, there is a possibility of micro leakage particularly from the electromagnetic valves, and therefore if the pressurized state lasts for a long time, the reliability of DSC system 3 lowers due to the hydraulic brake pressure drop and the stopped state of the vehicle V cannot be maintained.

The second determining module 10b determines the failure of the EPB system 4.

Since whether the rotor disk 21 is clamped by the brake pads 24 and 25 is determined by comparing the current value of the electric motor 43 with a determination threshold for the normal operation state thereof, the second determining module 10b determines the failure of the EPB system 4 based on the measurement value of the EPB controlling module 9.

Figure 4:
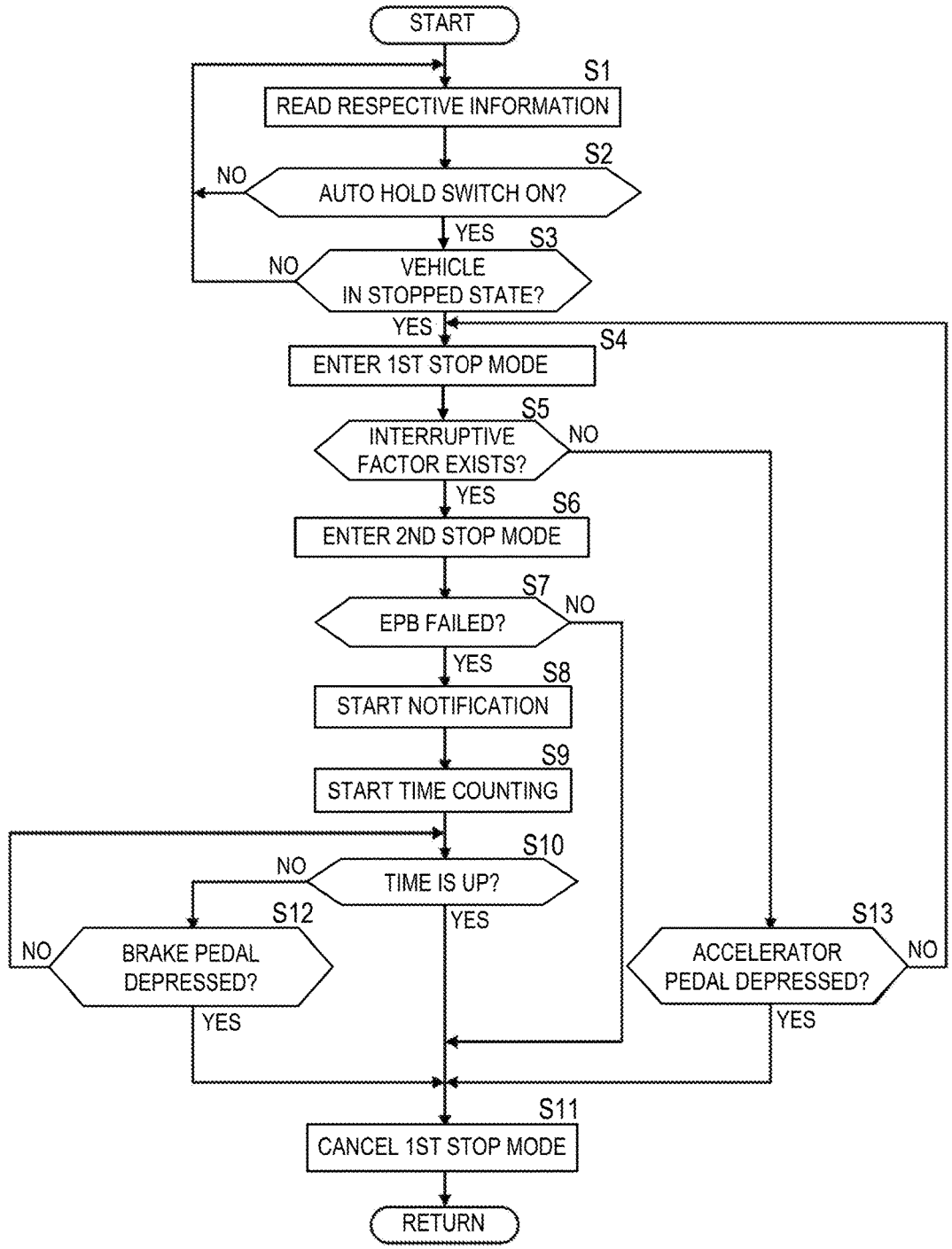
FIG. 4 is a flowchart of stop maintaining control processing.
Figure 5:
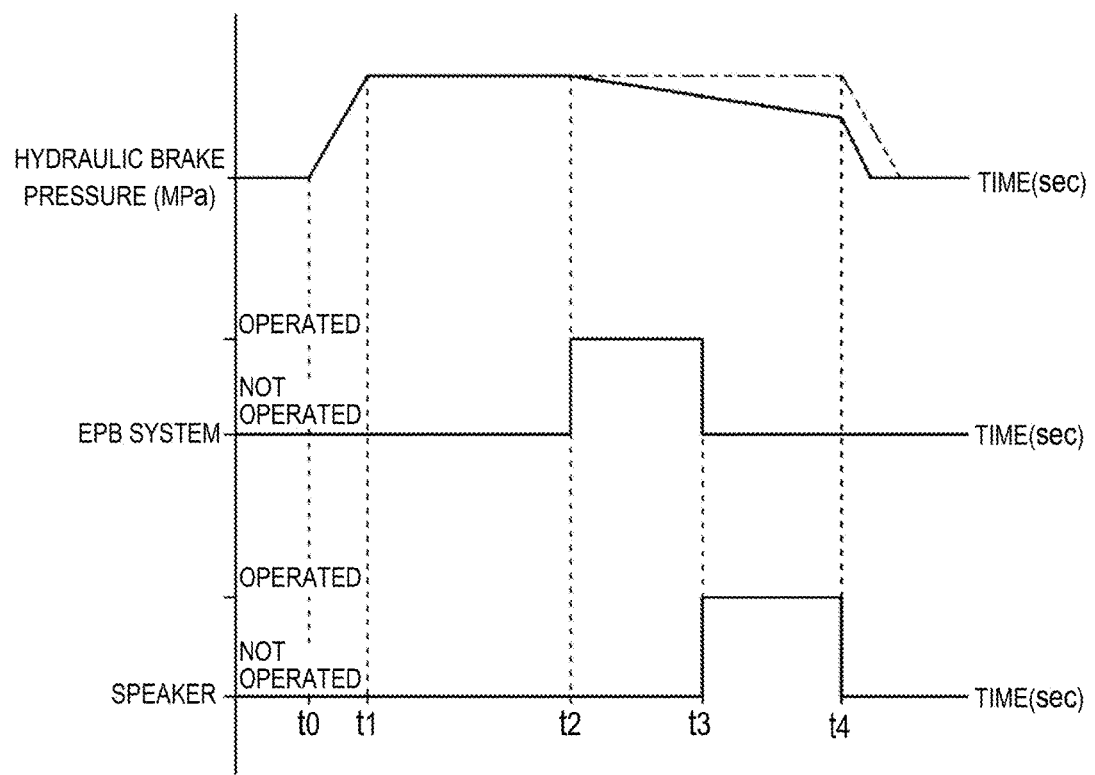
FIG. 5 is a time chart of the stop maintaining control processing.

Next, procedures of stop maintaining control processing are described based on the flowchart of FIG. 4 and the time chart of FIG. 5. Note that in FIG. 4, Si (i=1, 2, . . . ) indicates a process for each processing. Further in FIG. 5, regarding the hydraulic brake pressure, a solid line indicates a detection value of the hydraulic brake pressure sensor 34 at the time of failure of the DSC system 3, and a two-dotted chain line indicates a detection value of the hydraulic brake pressure sensor 34 in the normal state of the DSC system 3.

First at S1, the information, such as the detection values of the respective sensors, is read, and the process proceeds to S2.

At S2, whether the auto hold switch 60 is turned on by the driver is determined.

If the auto hold switch 60 is turned on as a result of the determination at S2, the process proceeds to S3 where whether the vehicle V is in the stopped state is determined. If the auto hold switch 60 is not turned on as a result of the determination at S2, the process returns to the start of the processing.

If the vehicle V is in the stopped state as a result of the determination at S3, in order to lower the burden on the driver accompanying the depression of the brake pedal 5 performed by the driver lowers, the process proceeds to S4 where the DSC system 3 enters the first stop mode.

If the vehicle V is not in the stopped state as a result of the determination at S3, the process returns to the start of the processing.

As illustrated in FIG. 5, when the driver depresses the brake pedal 5 at a time point t0, and the vehicle V stops at a time point t1. Since the DSC system 3 enters the first stop mode at the time point t1 at which the stopped state of the vehicle V is detected, the driver can release the depression of the brake pedal 5.

At S5, whether the interruptive factor which causes the interruption of the proper traveling after the vehicle stops once exists is determined.

If the interruptive factor exists as a result of the determination at S5, to prevent by the EPB system 4 that the vehicle V starts unintendedly to the driver, the process proceeds to S6 where the second stop mode is entered.

As illustrated in FIG. 5, when the hydraulic brake pressure of the pipe 27 lowers from a time point t2, the DSC system 3 is determined as failed, and while continuing the first stop mode, the entrance command of the second stop mode is outputted to the EPB system 4 by the ECU 10.

Note that this process is also similarly applied to when the interruptive factor other than the failure of the DSC system 3 is detected.

At S7, whether the EPB system 4 has failed is determined.

If the EPB system 4 has failed as a result of the determination at S7, the process proceeds to S8 where the lamp 63 and the speaker 64 are operated to notify the driver of the failure of the EPB system 4.

The purpose of this is to induce the driver to operate the foot brake device 2 since the stopped state of the vehicle V cannot be maintained by the DSC system 3 nor the EPB system 4.

As illustrated in FIG. 5, when the current value of the electric motor 43 lowers at a time point t3, the EPB system 4 is determined as failed, and the operations of the lamp 63 and the speaker 64 are started and the second stop mode is canceled while continuing the first stop mode.

In response to the operations of the lamp 63 and the speaker 64, time counting is started (S9).

At S10, whether a given period of time (e.g., 2 seconds) has lapsed (time is up) is determined.

If the time is up as a result of the determination at S10, the process proceeds to S11.

At S11, the first stop mode is canceled, the lamp 63 and the speaker 64 are canceled if they are in operation, and the process returns to the start of the processing.

The purpose of this is to release the hydraulic brake pressure to allow the vehicle V to move, so as to induce the driver to operate the foot brake device 2. This is effective in a situation where the driver is about to leave the seat even though the EPB system 4 has failed.

As illustrated in FIG. 5, the operations of the lamp 63 and the speaker 64 are stopped and the first stop mode is canceled at a time point t4.

If the time is not up as a result of the determination at S10, the process proceeds to S12 where whether the brake pedal 5 is depressed is determined.

If the brake pedal 5 is depressed as a result of the determination at S12, the process proceeds to S11.

If the brake pedal 5 is not depressed as a result of the determination at S12, the time counting continues. Note that at S11, the time count is reset.

If the EPB system 4 has not failed as a result of the determination at S7, the process proceeds to S11 where the hydraulic brake pressure is released.

If the interruptive factor does not exist as a result of the determination at S5, the process proceeds to S13 where whether the accelerator pedal 12 is depressed is determined.

If the accelerator pedal 12 is depressed as a result of the determination at S13, the process proceeds to S11 where the hydraulic brake pressure is released, and if the accelerator pedal 12 is not depressed, the process proceeds to S4.

Next, operations and effects of the stop maintaining system 1 are described.

According to the stop maintaining system 1 of this embodiment, when the first determining module 10a determines that the interruptive factor exists, the ECU 10 enters the second stop mode in which the EPB system 4 is operated to maintain the stopped state. Therefore, even if the interruptive factor which causes the interruption of the proper traveling after the vehicle stops once exists, the stopped state of the vehicle V is continued and maintained without burdening the driver due to the depression of the brake pedal 5.

Further, when the second determining module 10b determines the EPB system 4 as failed under the second stop mode, the ECU 10 operates the lamp 63 and the speaker 64. Therefore, the driver is reliably notified of the situation where the stopped state of the vehicle V cannot be continued and maintained.

Moreover, if the EPB system 4 is able to maintain the stopped state of the vehicle V, even if the DSC system 3 cannot maintain it, the notification is not issued. Therefore, the issuance of notification is suppressed to only minimal cases and the driver is not bothered.

The interruptive factor is at least one of the failure of the DSC system 3, the DSC system 3 being operated for over the given time period, the absence of the driver from the seat, and the engine misfire. Therefore, whether the vehicle is able to travel properly after the vehicle stops once is determined based on, in addition to the failure of the DSC system 3, the operational intention of the driver and the engine state.

When the driver depresses the accelerator pedal 12 in the first stop mode, the ECU 10 cancels the first stop mode. Therefore, the operational intention of the driver is reflected and high vehicle starting performance is obtained.

The ECU 10 stops the operations of the lamp 63 and the speaker 64 when the driver depresses the brake pedal 5 within the given period in the second stop mode. Therefore, the notification period is shortened while securing the travel safety, and the driver avoids being bothered.

When the brake pedal 5 is not depressed by the driver within the given period in the second stop mode, the ECU 10 stops the operations of the lamp 63 and the speaker 64 and cancels the first stop mode. Therefore, the vehicle becomes allowed to move and the driver is induced to operate the foot brake device before leaving the seat.

Next, modifications designed by partially changing the embodiment is described.

(1) The embodiment described above provides the example of providing the DSC controlling module which is independent from the ECU; however, the function of the DSC controlling module may integrally be incorporated in the ECU so that the processor 10c of the ECU also executes a software DSC controlling module. In this case, the DSC system is configured by the pressurizing unit and the DSC controlling module which is incorporated in the ECU, and the ECU outputs a control signal to the pressurizing unit. Similarly, the function of the EPB controlling module may integrally be incorporated in the ECU so that the processor 10c of the ECU also executes a software EPB controlling module.

Further, the pressurizing unit and the DSC controlling module may be formed integrally so that the entrance command of the first stop mode is directly outputted from the ECU to the pressurizing unit.

(2) The embodiment described above provides the example of using both the lamp and the speaker as the notification device; however, as long as the driver is notified when the stopped state of the vehicle can no longer be maintained, one of them may solely be provided. Further, the driver may be informed by displaying an alarm on a monitor screen as the notification device.

(3) The embodiment described above provides the example in which both of the engine restart condition for after an automatic engine stop, and the auto hold release condition are the release of depression of the brake pedal and the execution of depression of the accelerator pedal; however, the conditions may be designed to be one of the release of depression of the brake pedal and the execution of depression of the accelerator pedal.

(4) The embodiment described above provides the example of combining with the automatic stop control (idle stop) of the engine; however, the combination may be with an automatic tracking control (auto cruise system).

(5) Those skilled in the art may implement a variety of other modes by adding various changes to the embodiment without departing from the scope of the present invention, and such modes fall under the scope of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

V Vehicle
1 Stop Maintaining System
2 Foot Brake Device
3 DSC System
4 EPB System
5 Brake Pedal
6 Vehicle Wheel
10 ECU
10a First Determining Module
10b Second Determining Module
12 Accelerator Pedal
20 Hydraulic Brake Mechanism 30 Pressurizing Unit
40 Electric Brake Mechanism
43 Electric Motor
63 Lamp
64 Speaker

What is claimed is:

1. A vehicle stop maintaining system including a foot brake mechanism for braking vehicle wheels by applying hydraulic brake pressure to hydraulic brake mechanisms according to depression of a brake pedal, a brake force control mechanism having a pressurizer that increases hydraulic brake pressure to be applied to the hydraulic brake mechanisms, and for braking the vehicle wheels by controlling the pressurizer independently from the depression of the brake pedal, an electric parking brake mechanism for braking the vehicle wheels by operating an electric brake mechanism that is driven by an electric actuator independently from the depression of the brake pedal, and a controller comprising a processor configured to enter a first stop mode in which the brake force control mechanism is operated to maintain a stopped state when the vehicle is detected to be in the stopped state, the processor configured to execute:
    a first determining module and a second determining module stored as software in non-volatile memory;
    the first determining module for determining a state where the stopped state of the vehicle cannot be maintained; and
    the second determining module for determining a failure of the electric parking brake mechanism;
    the system further comprising a notification device for issuing a notification to a vehicle driver,
    wherein if the first determining module determines that the vehicle is in the state where the stopped state of the vehicle cannot be maintained, the controller enters a second stop mode in which the electric parking brake mechanism is operated to maintain the stopped state,
    wherein if the first determining module does not determine the state where the stopped state of the vehicle cannot be maintained under the first stop mode, the controller is prohibited from operating the notification device, and
    wherein if the first determining module determines that the vehicle is in the state where the stopped state of the vehicle cannot be maintained and if the second determining module determines the electric parking brake mechanism has failed under the second stop mode, the controller operates the notification device.

2. The system of claim 1, wherein the state where the stopped state of the vehicle cannot be maintained includes an interruptive factor that causes an interruption of proper traveling, and the interruptive factor includes at least one of a failure of the brake force control mechanism, the brake force control mechanism being operated over a predetermined period of time, an absence of the driver from a driver's seat, and an engine misfire.

3. The system of claim 2, wherein when the driver depresses an accelerator pedal in the first stop mode, the controller cancels the first stop mode.

4. The system of claim 3, wherein when the driver depresses the brake pedal within a given period in the second stop mode, the controller stops the operation of the notification device.

5. The system of claim 4, wherein when the given period in the second stop mode has elapsed in the second stop mode, the controller stops the operation of the notification device and cancels the first stop mode.

6. The system of claim 3, wherein when a given period in the second stop mode has elapsed in the second stop mode, the controller stops the operation of the notification device and cancels the first stop mode.

7. The system of claim 2, wherein when the driver depresses the brake pedal within a given period in the second stop mode, the controller stops the operation of the notification device.

8. The system of claim 7, wherein when the given period in the second stop mode has elapsed in the second stop mode, the controller stops the operation of the notification device and cancels the first stop mode.

9. The system of claim 2, wherein when a given period in the second stop mode has elapsed in the second stop mode, the controller stops the operation of the notification device and cancels the first stop mode.

10. The system of claim 1, wherein when the driver depresses an accelerator pedal in the first stop mode, the controller cancels the first stop mode.

11. The system of claim 10, wherein when the driver depresses the brake pedal within a given period in the second stop mode, the controller stops the operation of the notification device.

12. The system of claim 11, wherein when the given period in the second stop mode has elapsed in the second stop mode, the controller stops the operation of the notification device and cancels the first stop mode.

13. The system of claim 10, wherein when a given period in the second stop mode has elapsed in the second stop mode, the controller stops the operation of the notification device and cancels the first stop mode.

14. The system of claim 1, wherein when the driver depresses the brake pedal within a given period in the second stop mode, the controller stops the operation of the notification device.

15. The system of claim 14, wherein when the given period in the second stop mode has elapsed in the second stop mode, the controller stops the operation of the notification device and cancels the first stop mode.

16. The system of claim 1, wherein when a given period in the second stop mode has elapsed in the second stop mode, the controller stops the operation of the notification device and cancels the first stop mode.

* * * * *